United States Patent
Oshimi et al.

(10) Patent No.: US 6,411,831 B1
(45) Date of Patent: Jun. 25, 2002

(54) PORTABLE TELEPHONE

(75) Inventors: Masanori Oshimi, Kanagawa; Shinobu Iida, Tokyo, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/362,775

(22) Filed: Jul. 28, 1999

(30) Foreign Application Priority Data

Aug. 7, 1998 (JP) ............................................ 10-234857

(51) Int. Cl.⁷ .................................................. H04B 1/38
(52) U.S. Cl. ......................... 455/575; 455/78; 455/13.3
(58) Field of Search ................................ 455/575, 129, 455/462, 83, 569, 277.1, 13.3, 348, 349, 346, 347, 193.1, 78; 343/702, 876, 906

(56) References Cited

U.S. PATENT DOCUMENTS

| | | | | |
|---|---|---|---|---|
| 5,180,315 A | * | 1/1993 | Nagashima | 439/581 |
| 5,754,962 A | * | 5/1998 | Griffin | 455/569 |
| 5,801,661 A | * | 9/1998 | Suzuki | 343/702 |
| 5,898,908 A | * | 4/1999 | Griffin et al. | 455/127 |
| 5,944,546 A | * | 8/1999 | Miyake et al. | 439/188 |
| 6,031,492 A | * | 2/2000 | Griffin et al. | 343/702 |
| 6,064,863 A | * | 5/2000 | Matai | 455/90 |
| 6,081,724 A | * | 6/2000 | Wilson | 455/462 |
| 6,112,060 A | * | 8/2000 | Lim et al. | 455/78 |
| 6,133,884 A | * | 10/2000 | Talvitie et al. | 343/702 |

FOREIGN PATENT DOCUMENTS

GB  2342256 B  *  9/2000  ............ H04B/1/38

* cited by examiner

*Primary Examiner*—Daniel Hunter
*Assistant Examiner*—C. Chow
(74) *Attorney, Agent, or Firm*—Pearne & Gordon LLP

(57) ABSTRACT

A portable telephone comprising an external antenna connector portion 7 for connecting it to an external antenna 2 can detect hook conditions by providing a detecting terminal 73 utilizing a shield portion 72 of the external antenna connector portion 7. In an on-hook condition where the portable telephone is mounted on an on-vehicle adapter 1, corresponding shield portions 72, 73 and 32 of the external antenna connector portions 7 and 3 provided on both the portable telephone and the on-vehicle adapter come into contact with each other. On the other hand, in an off-hook condition where the portable telephone is disengaged from the on-vehicle adapter or the on-vehicle holder, the corresponding shield portions are out of contact from each other. The hook conditions can be thus detected by detecting the change in the contact between the shield portions.

7 Claims, 1 Drawing Sheet

PORTABLE TELEPHONE

BACKGROUND OF THE INVENTION

1. Field of the Invention

This invention relates to a portable telephone, and more particularly, to a portable telephone which detects, with a simple structure, hook conditions when it is mounted on an on-vehicle adapter or on-vehicle holder.

2. Description of the Related Art

There is provided inside a vehicle, an on-vehicle adapter or on-vehicle holder for a portable telephone for connecting the portable telephone to an external antenna. When the portable telephone is laid to be mounted on the on-vehicle adapter, an external antenna connector provided on a back face of the portable telephone comes into contact with an external antenna connector of the on-vehicle adapter. This connector is connected to the external antenna provided on the vehicle, and the portable telephone waits for a telephone communication through the external antenna.

When this portable telephone is lifted from the on-vehicle adapter, the portable telephone will be in an off-hook condition and thus a required communication will start. When the portable telephone is placed on the on-vehicle adapter, it will be in an on-hook condition to terminate the telephone communication. In order to detect the hook conditions of this portable telephone, a reed switch is incorporated in a conventional portable telephone, while a magnet is provided on the on-vehicle adapter or on-vehicle holder. The hook conditions are discriminated according to whether or not the reed switch on the portable telephone detects a magnetic field of this magnet, and operations according to the respective hook conditions are conducted.

However, as the portable telephone becomes more and more compact, an area for installation inside the portable telephone is limited. With respect to the hook detecting method by means of a combination with the on-vehicle appliances, which is less frequently used among the forms in which the portable telephone is used, a method for conducting such detection without the reed switch has been sought for.

SUMMARY OF THE INVENTION

The present invention is to comply with such requirements and it is an object of the present invention to provide a portable telephone which can detect, with a simple structure, the on-hook condition and the off-hook condition when combined with the on-vehicle appliances.

According to the present invention, the hook conditions are detected by utilizing the shield portion of the external antenna connector portion of the portable telephone.

When the portable telephone is mounted on the on-vehicle adapter or on-vehicle holder, the external antenna connectors respectively on the portable telephone and the on-vehicle adapter or the like are connected with each other so that their shield portions also are connected with each other. By making a part of the shield portion of the portable telephone as a detecting terminal, and by monitoring a voltage level at the detecting terminal, the connection between both the shield portions is discriminated. Recognizing the connected state of the shield portions as the on-hook condition, while recognizing the unconnected state of the shield portions as the off-hook condition, the hook conditions are detected.

According to a first aspect of the present invention, there is provided a portable telephone comprising an external antenna connector portion for connecting it to an external antenna, wherein hook conditions are detected by utilization of the external antenna connector portion. In the on-hook condition where the portable telephone is mounted on the on-vehicle adapter and the like, the shield portions provided on both the portable telephone and the on-vehicle adapter contact with each other. On the other hand, in the off-hook condition where the portable telephone is disengaged from the on-vehicle adapter or on-vehicle holder, there is no contact between the shield portions. By detecting this change in condition, it is possible to detect the hook conditions.

According to a second aspect of the present invention, there is provided a portable telephone, wherein a portable telephone is provided with a detecting terminal formed by utilization of a part of the shield portion, the detecting terminal being earthed when the portable telephone is mounted on an on-vehicle adapter or on-vehicle holder, the detecting terminal becoming open when the portable telephone is disengaged from the on-vehicle adapter or on-vehicle holder. When the portable telephone is mounted on the on-vehicle adapter or the like, the detecting terminal formed of a part of the shield portion will be in communication with the other part of the shield portion to reach the same electric potential (grounded electric potential). When the portable telephone is disengaged from the on-vehicle adapter or the like, there will be no contact between the shield portions, resulting in an open state of the detecting terminal. A voltage level of the detecting terminal is monitored by means of a voltage detector in a microcomputer or the like, whereby the hook conditions can be judged.

DETAILED DESCRIPTION OF THE PRESENT INVENTION

The present invention will be described in detailed referring to the accompanying drawings.

Figure 1:
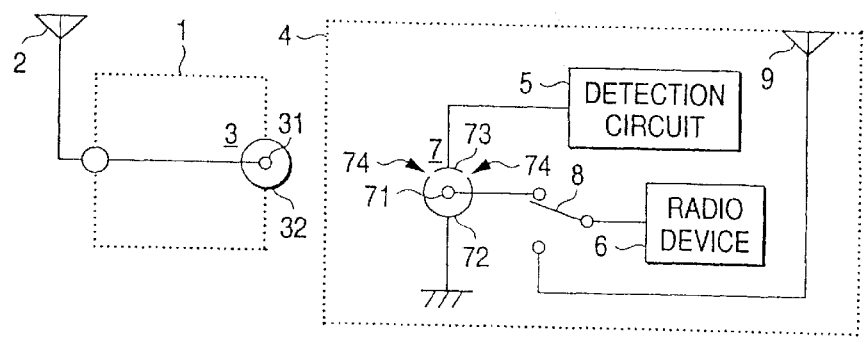
FIG. 1 is a block diagram showing the structures of the portable telephone and the on-vehicle adapter in an embodiment according to the present invention.
Figure 2:
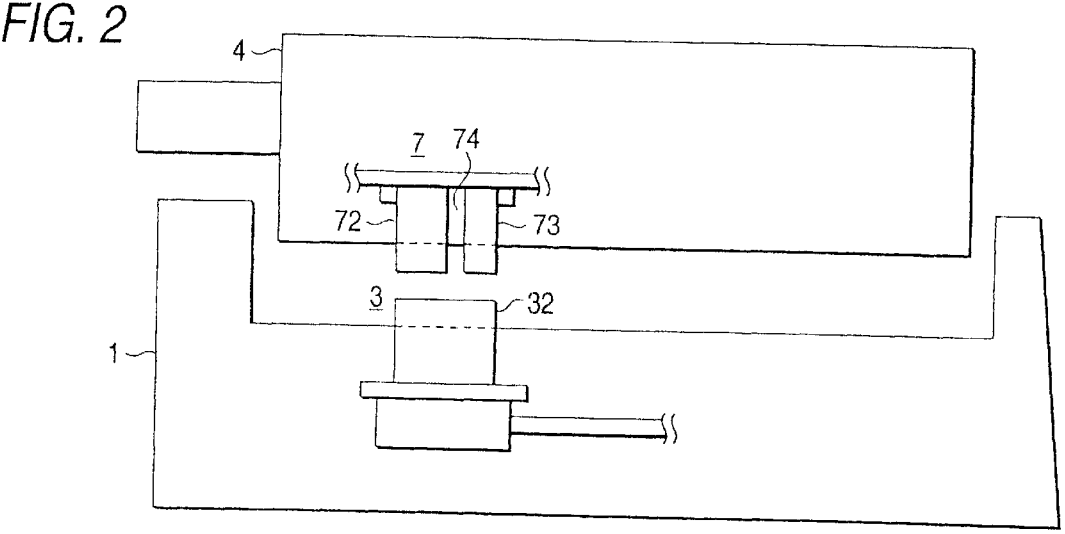
FIG. 2 is an explanatory view showing the portable telephone and the on-vehicle adapter in the connected state, in the embodiment according to the present invention.

FIG. 1 is a block diagram showing the portable telephone and the on-vehicle adapter according to the embodiment. The on-vehicle adapter 1 has an external antenna connector 3 which is connected to an antenna connector of the portable telephone 4. The external antenna connector 3 includes an RF terminal 31 connected to an external antenna 2 and an antenna shield portion 32 surrounding the RF terminal 31.

Figure 3A:
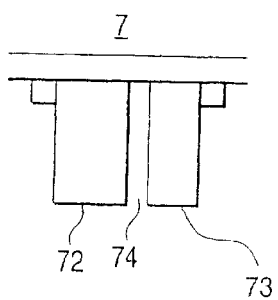
FIGS. 3A and 3B are views showing the structure of the external antenna connector of the portable telephone in the embodiment according to the present invention.
Figure 3B:
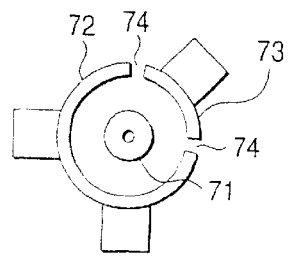

On the other hand, the portable telephone 4 is provided with a detecting circuit 5 for detecting hook conditions, an internal antenna 9 incorporated in the portable telephone 4, an external antenna connector 7 which is adapted to contact the external antenna connector 3 of the on-vehicle adapter 1 when the portable telephone is mounted on the on-vehicle adapter 1, and a change-over switch 8 for switching to an antenna connected to a wireless installation. The external antenna connector 7 includes an RF terminal 71 connected to one terminal of the change-over switch 8 and an antenna shield portion surrounding the RF terminal 71. The antenna shield portion is divided by means of gaps 74 into an earthed antenna shield portion 72 and a hook detecting terminal 73 connected to the detecting circuit 5. The shape of this external antenna connector 7 is illustrated in FIGS. 3A and 3B in an enlarged scale. FIG. 3A is a side view and FIG. 3B is a top view.

The detecting circuit 5 is composed of a voltage detector such as a microcomputer and the like.

When the potable telephone 4 is mounted on the on-vehicle adapter 1, the external antenna 7 provided on a back face of the portable telephone 4 comes into contact with the external antenna connector 3 of the on-vehicle adapter 1 so that the RF terminal 31 comes into contact with the RF terminal 71. On this occasion, the antenna shield portion 32 of the external antenna connector 3 is connected to both the antenna shield portion 72 and the hook detecting terminal 73 of the external antenna connector 7 to short-circuit therebetween. As a result, the hook detecting terminal 73 will be earthed. When the detecting circuit 5 detects that the hook detecting terminal 73 has been earthed, it discriminates that the portable telephone 4 is in a mounted state on the on-vehicle adapter 1, that is, in the on-hook condition.

In this case, by selecting the external antenna by means of the change-over switch 8, the wireless installation 6 of the portable telephone is connected to the external antenna 2 through the change-over switch 8, the RF terminal 71 of the external antenna connector 7 and the RF terminal 31 of the external antenna connector 3.

On the other hand, when the portable telephone 4 is disengaged from the on-vehicle adapter 1, the shield portion 32 of the external antenna connector 3 is separated from the antenna shield portion 72 and the hook detecting terminal 73 of the external antenna connector 7, and thus the hook detecting terminal 73 becomes off the ground. The detecting circuit 5 detects that the hook detecting terminal 73 is no longer earthed, and accordingly discriminates that the portable telephone 4 is disengaged from the on-vehicle adapter 1, that is, in the off-hook condition.

Moreover, in case where the change-over switch 8 selects the internal antenna in this state, the wireless installation 6 of the portable telephone is connected to the internal antenna 9.

As described above, the hook conditions of the portable telephone 4 can be detected by detecting whether the hook detecting terminal 73 has been earthed or not.

It is obvious from the above explanation that with the portable telephone according to the present invention, the hook conditions of the portable telephone are detected by utilization of the external antenna connector portion provided on the back of the portable telephone. Therefore, the reed switch is no longer necessary on the side of the portable telephone, and a special equipment such as a magnet or a switch etc. is no longer necessary on the side of the on-vehicle adapter or on-vehicle holder.

What is claimed is:

1. A portable telephone comprising:
   an external antenna connector portion connectable to an external antenna,
   wherein hook conditions of the external antenna connector to the external antenna are detected by utilization of a shield portion of said external antenna connector portion to the external antenna.

2. The portable telephone as claimed in claim 1, wherein said portable telephone is provided with a detecting terminal formed by utilization of a part of said shield portion, said detecting terminal being earthed when the portable telephone is mounted on an on-vehicle adapter, said detecting terminal becoming open when the portable telephone is disengaged from said on-vehicle adapter or on-vehicle holder.

3. A hook condition detecting system for a portable telephone comprising:
   a portable telephone including a detection circuit and a first external connector, the first external connector having a first shield portion connected to the detection circuit and a second shield portion being earthed, the detection circuit for detecting whether or not the first shield portion is earthed; and
   a holder including a second external connector having a third shield portion,
      wherein the first shield portion is earthed through the second shield portion and the third shield portion when the portable telephone mounted on the holder,
      wherein the detection circuit judges the portable telephone to be an on-hook condition with respect to the holder when the first shield portion is earthed,
      wherein the detection circuit judges the portable telephone to be an off-hook condition with respect to the holder when the first shield portion is not earthed.

4. The hook condition detecting system as claimed in claim 3, wherein the portable telephone further includes a wireless installation, an first external antenna and a switch circuit, the first external connector having a first RF terminal connected to one of the wireless installation and the first external antenna through the switch circuit,
   wherein the holder further includes a second external antenna, the second connector having a second RF terminal connected to the second external antenna,
   wherein the wireless installation is connected to the second external antenna through the switch circuit, the first RF terminal and the second RF terminal in the on-hook condition,
   wherein the wireless installation is connected to the first external antenna through the switch circuit in the on-hook condition.

5. A portable telephone as claimed in claim 1 wherein the hook conditions detected are whether the external connector portion is connected or unconnected to the external antenna.

6. A portable telephone comprising:
   an external antenna connector connectable to an external antenna;
   an internal antenna;
   a wireless installation;
   a switch having a first state connecting the wireless installation to the external antenna connector and a second state connecting the wireless installation to the internal antenna; and
   a detecting circuit operating the switch responsive to a hook condition of the external antenna connector to the external antenna detected by using a shield portion of the external antenna connector to the external antenna.

7. A portable telephone as claimed in claim 6 wherein the shield portion is connected to ground and the detecting circuit detects whether a detecting terminal of the external antenna connector is connected to ground.

\* \* \* \* \*